United States Patent
Hyung et al.

(10) Patent No.: US 9,994,728 B2
(45) Date of Patent: *Jun. 12, 2018

(54) PHOTOSENSITIVE RESIN COMPOSITION AND COLOR FILTER USING THE SAME

(71) Applicant: Samsung SDI Co., Ltd., Yongin-si (KR)

(72) Inventors: Kyung-Hee Hyung, Suwon-si (KR);
Taek-Jin Baek, Suwon-si (KR);
Eui-June Jeong, Suwon-si (KR);
Ju-Ho Jung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/840,767

(22) Filed: Aug. 31, 2015

(65) Prior Publication Data

US 2016/0090501 A1 Mar. 31, 2016

(30) Foreign Application Priority Data

Sep. 25, 2014 (KR) ........................ 10-2014-0128421

(51) Int. Cl.
| | | |
|---|---|---|
| C09D 133/14 | (2006.01) |
| C09D 11/101 | (2014.01) |
| C09D 11/326 | (2014.01) |
| C08F 220/38 | (2006.01) |
| C08L 33/14 | (2006.01) |
| G02B 5/22 | (2006.01) |
| C08K 3/00 | (2018.01) |
| C08K 5/00 | (2006.01) |
| G02B 5/20 | (2006.01) |

(52) U.S. Cl.
CPC .......... *C09D 133/14* (2013.01); *C08F 220/38* (2013.01); *C08L 33/14* (2013.01); *C08K 3/0033* (2013.01); *C08K 5/0041* (2013.01); *G02B 5/201* (2013.01); *G02B 5/223* (2013.01)

(58) Field of Classification Search
CPC ... C09D 11/101; C09D 11/037; C09D 11/322; C09D 11/326; C09D 11/40; C08L 33/14; C08F 2220/0387; C08F 220/30; C08F 220/06; G02B 5/223; G02B 5/23
See application file for complete search history.

(56) References Cited

U.S. PATENT DOCUMENTS

| | | |
|---|---|---|
| 6,713,227 B2 | 3/2004 | Machiguchi et al. |
| 6,723,835 B1 | 4/2004 | Millard et al. |
| 6,864,022 B2 | 3/2005 | Machiguchi et al. |
| 7,193,068 B2 | 3/2007 | Araki et al. |
| 7,572,559 B2 | 8/2009 | Araki |

(Continued)

FOREIGN PATENT DOCUMENTS

| | | |
|---|---|---|
| CN | 1834795 A | 9/2006 |
| CN | 102276589 A | 12/2011 |

(Continued)

OTHER PUBLICATIONS

Search Report in commonly owned Chinese Application No. 201210251567.7 dated Feb. 14, 2014, pp. 1-2.

(Continued)

*Primary Examiner* — Sanza Mcclendon
(74) *Attorney, Agent, or Firm* — Additon, Higgins & Pendleton, P.A.

(57) ABSTRACT

A photosensitive resin composition includes (A) a colorant including a copolymer represented by Chemical Formula 1 and a green pigment; (B) a binder resin; (C) a photopolymerizable monomer; (D) a photopolymerization initiator; and (E) a solvent, wherein the copolymer represented by Chemical Formula 1 is included in an amount of about 100 parts by weight to about 300 parts by weight based on about 100 parts by weight of the green pigment:

[Chemical Formula 1]

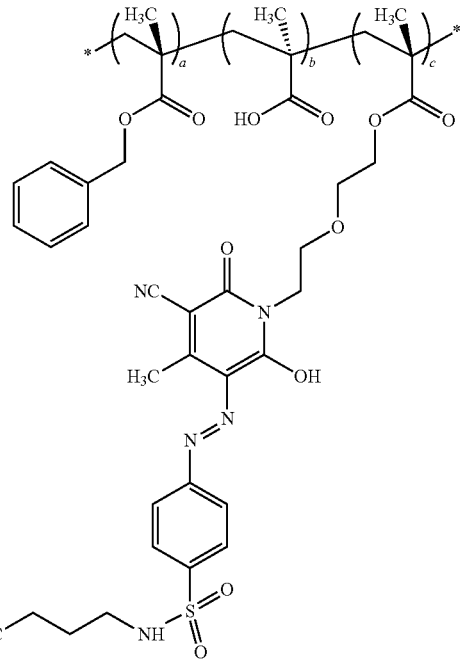

wherein a is an integer ranging from 1 to 100, b is an integer ranging from 1 to 100, and c is an integer ranging from 1 to 50. A color filter manufactured using the same is also provided.

12 Claims, No Drawings

(56) References Cited

U.S. PATENT DOCUMENTS

| | | |
|---|---|---|
| 8,514,353 B2 | 8/2013 | Yamada et al. |
| 8,828,631 B2 | 9/2014 | Hyung et al. |
| 9,268,063 B2 | 2/2016 | Idei et al. |
| 9,323,145 B2 | 4/2016 | Kaneko et al. |
| 2008/0254634 A1 | 10/2008 | Park et al. |
| 2012/0161087 A1 | 6/2012 | Jung et al. |
| 2012/0205599 A1 | 8/2012 | Matsumoto et al. |
| 2012/0300465 A1 | 11/2012 | Chang et al. |

FOREIGN PATENT DOCUMENTS

| | | |
|---|---|---|
| JP | 2001-288393 A | 10/2001 |
| JP | 2002-014221 A | 1/2002 |
| JP | 2002-014223 A | 1/2002 |
| JP | 2004-277700 A | 10/2004 |
| JP | 2006-265495 A | 10/2006 |
| JP | 2007-057658 A | 3/2007 |
| JP | 2009-300999 A | 12/2009 |
| JP | 2011-164564 A | 8/2011 |
| JP | 2011-221515 A | 11/2011 |
| JP | 2012-208474 A | 10/2012 |
| KR | 10-1996-7003246 | 6/1996 |
| KR | 10-2006-0050015 A | 5/2006 |
| KR | 2012-0071742 A | 7/2012 |
| KR | 10-2012-0105574 A | 9/2012 |
| KR | 10-2012-0105575 A | 9/2012 |
| KR | 10-2012-0131628 A | 12/2012 |
| KR | 10-2013-0074409 A | 7/2013 |
| KR | 10-2014-0111493 A | 9/2014 |
| TW | 201339759 | 1/2013 |
| TW | 201339760 | 1/2013 |
| TW | 201337459 | 9/2013 |
| WO | 95/00885 | 1/1995 |

OTHER PUBLICATIONS

English-translation of Search Report in commonly owned Chinese Application No. 201210251567.7 dated Feb. 14, 2014, pp. 1-2.

PHOTOSENSITIVE RESIN COMPOSITION AND COLOR FILTER USING THE SAME

CROSS-REFERENCE TO RELATED APPLICATION

This application claims priority to and the benefit of Korean Patent Application No. 10-2014-0128421 filed in the Korean Intellectual Property Office on Sep. 25, 2014, the entire disclosure of which is incorporated herein by reference.

FIELD OF THE INVENTION

This disclosure relates to a photosensitive resin composition and a color filter using the same.

BACKGROUND

A color filter is used for an optical filter for devices such as a liquid crystal display (LCD), a camera, and the like, and is a thin film-type optical part extracting more than 3 colors from a white light and working fine pixel units. The pixel has a size of tens to hundreds of micrometers. This color filter has a structure of laminating a black matrix layer with a predetermined pattern to block a boundary between pixels and a pixel region including three primary colors of red (R), green (G), and blue (B) sequentially arranged in a predetermined order on a transparent substrate.

Generally, a color filter may be fabricated by coating three or more colors on a transparent substrate using processes such as dyeing, electrophoretic deposition, printing, and pigment dispersion. Recently, pigment dispersion using a pigment-dispersible color resist is mainly used.

A pigment dispersion method forms a colored film by repeating a series of processes such as coating, exposing to a light, developing, and curing a photopolymerizable composition including a coloring agent on a transparent substrate including a black matrix. The pigment dispersion method can improve heat resistance and durability, which are very important characteristics for a color filter, and can provide a film with a uniform thickness. Therefore, the method is widely applied.

Recently, a large liquid crystal display (LCD) requires high luminance and a high contrast ratio, but in order to satisfy these requirements, color reproducibility of a color filter may be deteriorated.

SUMMARY

One embodiment provides a photosensitive resin composition that can have excellent heat resistance and chemical resistance as well as dispersion stability and coloring properties.

Another embodiment provides a color filter that can have excellent color reproducibility and high luminance and high contrast ratio by using the photosensitive resin composition.

One embodiment provides a photosensitive resin composition that includes (A) a colorant including a copolymer represented by Chemical Formula 1 and a green pigment; (B) a binder resin; (C) a photopolymerizable monomer; (D) a photopolymerization initiator; and (E) a solvent, wherein the copolymer represented by Chemical Formula 1 is included in an amount of about 100 parts by weight to about 300 parts by weight based on about 100 parts by weight of the green pigment.

[Chemical Formula 1]

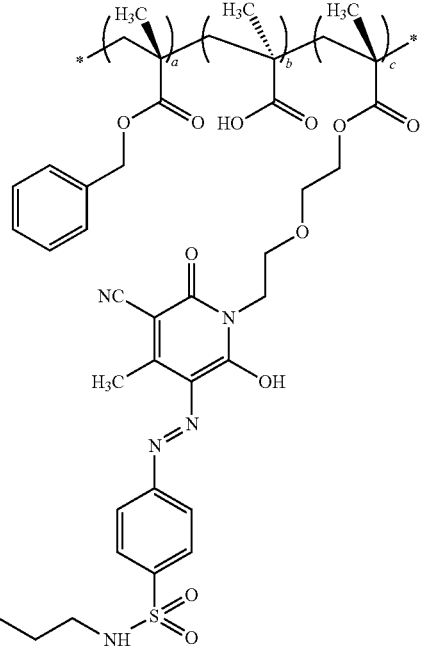

In Chemical Formula 1,
a is an integer ranging from 1 to 100, b is an integer ranging from 1 to 100, and c is an integer ranging from 1 to 50.

The copolymer represented by Chemical Formula 1 may be included in an amount of about 100 parts by weight to about 250 parts by weight based on about 100 parts by weight of the green pigment.

The copolymer represented by Chemical Formula 1 may be a yellow dye.

The copolymer represented by Chemical Formula 1 may have a maximum absorption wavelength in a wavelength region of about 460 nm to about 560 nm, and transmittance of about 80% to about 100% in a wavelength region of about 560 nm to about 660 nm.

The copolymer represented by Chemical Formula 1 may have a thermal decomposition temperature of about 250° C. to about 500° C.

The copolymer represented by Chemical Formula 1 may have a weight average molecular weight of about 3,000 g/mol to about 50,000 g/mol.

The copolymer represented by Chemical Formula 1 may have an acid value of about 20 mgKOH/g to about 200 mgKOH/g.

The green pigment may include at least one selected from C.I. green pigment 7, C.I. green pigment 36 and C.I. green pigment 58.

The colorant may further include a yellow pigment, a red pigment, or a combination thereof.

The yellow pigment may include at least one selected from C.I. yellow pigment 138, C.I. yellow pigment 139. C.I. yellow pigment 150 and C.I. yellow pigment 185, and the red pigment may include at least one selected from C.I. red pigment 177 and C.I. red pigment 254.

The photosensitive resin composition may include about 2 wt % to about 12 wt % of the colorant (A); about 1 wt % to about 10 wt % of the binder resin (B); about 2 wt % to about 20 wt % of the photopolymerizable monomer (C);

about 0.1 wt % to about 4 wt % of the photopolymerization initiator (D); and a balance amount of the solvent (E).

The photosensitive resin composition may include at least one additive selected from malonic acid; 3-amino-1,2-propanediol; a coupling agent having a vinyl group or a (meth)acryloxy group; a leveling agent; a fluorine-based surfactant; and a radical polymerization initiator.

Another embodiment provides a color filter manufactured using the photosensitive resin composition.

The color filter may have color reproducibility of greater than or equal to about 35%, for example greater than or equal to about 68%, for example greater than or equal to about 72%, for example greater than or equal to about 80%, for example greater than or equal to about 85% relative to NTSC (ClExy 1931 color coordinate).

Other embodiments are included in the following detailed description.

A color filter having excellent color reproducibility, high luminance and a high contrast ratio may be realized by using a photosensitive resin composition having excellent high luminance and a high contrast ratio as well as excellent dispersion stability, and coloring properties.

DETAILED DESCRIPTION

The present invention will be described more fully hereinafter, in which exemplary embodiments of the present invention are described. This invention may, however, be embodied in many different forms and should not be construed as limited to the exemplary embodiments set forth herein. These exemplary embodiments disclosed in this specification are provided so that this disclosure will satisfy applicable legal requirements.

As used herein, when a specific definition is not otherwise provided, the term "substituted" refers to one substituted with at least one substituent selected from a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C30 heteroaryl group, or a combination thereof, instead of hydrogen.

As used herein, when a specific definition is not otherwise provided, the term "hetero" may refer to one substituted with at least one hetero atom of N, O, S and/or P, instead of at least one C in a cyclic substituent.

As used herein, when a specific definition is not otherwise provided, "(meth)acrylate" refers to both "acrylate" and "methacrylate," and "(meth)acrylic acid" refers to "acrylic acid" and "methacrylic acid."

As used herein, when a specific definition is not otherwise provided, the term "combination" refers to mixing or copolymerization.

As used herein, unless a specific definition is otherwise provided, a hydrogen atom is bonded at the position when a chemical bond is not drawn where a bond would otherwise appear.

As used herein, when specific definition is not otherwise provided, "*" indicates a point where the same or different atom or chemical formula is linked.

A photosensitive resin composition according to one embodiment includes (A) a colorant including a copolymer represented by Chemical Formula 1 and a green pigment; (B) a binder resin; (C) a photopolymerizable monomer; (D) a photopolymerization initiator; and (E) a solvent, wherein the copolymer represented by Chemical Formula 1 is included in an amount of about 100 parts by weight to about 300 parts by weight based on about 100 parts by weight of the green pigment.

[Chemical Formula 1]

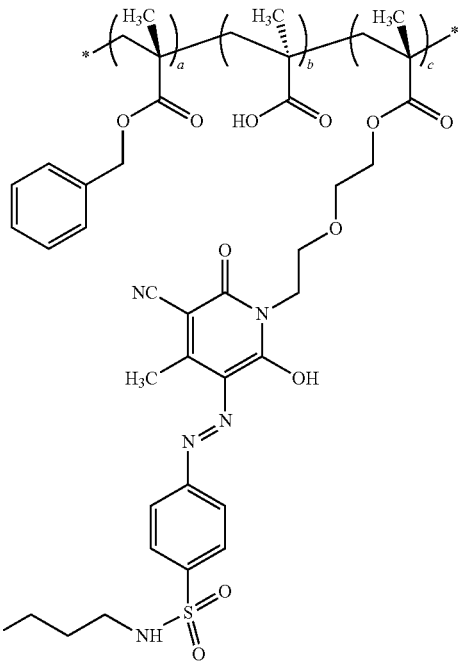

In Chemical Formula 1,
a is an integer ranging from 1 to 100, b is an integer ranging from 1 to 100, and c is an integer ranging from 1 to 50.

The copolymer represented by Chemical Formula 1 can have improved dissolubility for an organic solvent, and has no particle or a particle with a primary particle diameter of several nanometers or less in a solution, unlike a pigment or a pigment derivative particle. That is, the copolymer represented by Chemical Formula 1 may be used as a dye having no particle, and thereby light scattering can decrease and a high contrast ratio may be realized.

Generally, to provide a color filter with high color reproducibility, for example of greater than or equal to about 35%, an another example greater than or equal to about 68%, and as yet another example greater than or equal to about 72% relative to NTSC (ClExy 1931 color coordinate) using pigment as the colorant, the amount of pigment is generally increased and thus pattern characteristics of a photosensitive resin composition can be reduced, and luminescence characteristics may be deteriorated. However, since the copolymer represented by Chemical Formula 1 functions as a yellow coloring compound, that is a yellow dye, it may replace a conventional yellow pigment or may be mixed with a conventional yellow pigment, and the amount of a yellow pigment can be decreased and thereby high luminescence characteristics and high color reproducibility may be realized. Furthermore, the copolymer represented by Chemical Formula 1 can have more improved coloring properties than a conventional yellow pigment.

In general, a monomeric dye may move to the surface of a film due to increased mobility during heating of a photosensitive resin composition, or may be eluted by another chemical material solution during processes. According to one embodiment, since the copolymer represented by Chemical Formula 1 that is useable as a dye, for example a yellow dye, is a polymer, it may cross-link with monomers in the photosensitive resin composition, which can decrease mobility of the dye and can increase film hardness through the cross-linking bond, and thereby can decrease elution of the copolymer dye even though other chemical material solutions invade during processing.

Hereinafter, each component is described in detail.

(A) Colorant

A photosensitive resin composition according to one embodiment includes a colorant including the copolymer represented by Chemical Formula 1 and a green pigment.

The copolymer represented by Chemical Formula 1 is included in an amount of about 100 parts by weight to about 300 parts by weight, for example about 100 parts by weight to about 250 parts by weight, based on about 100 parts by weight of the green pigment. In some embodiments, the colorant may include the copolymer represented by Chemical Formula 1 in an amount of about 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, or 300 parts by weight. Further, according to some embodiments of the present invention, the amount of the copolymer represented by Chemical Formula 1 can be in a range from about any of the foregoing amounts to about any other of the foregoing amounts.

When the copolymer represented by Chemical Formula 1 is included in an amount within the above range, coloring properties and transmittance can be improved.

The copolymer represented by Chemical Formula 1 is a yellow coloring compound, for example a yellow dye. When the copolymer represented by Chemical Formula 1 is added to the photosensitive resin composition, an amount of a pigment can decrease, and thereby dispersion stability and coloring properties may be improved.

The copolymer represented by Chemical Formula 1 can have high durability due to improved dissolubility for an organic solvent as described above. In addition, the copolymer represented by Chemical Formula 1 is usable as a yellow dye, and thereby dispersion of a pigment may be easily made and an amount of a yellow pigment can be decreased. Therefore, when the copolymer represented by Chemical Formula 1 is used for preparing a photosensitive resin composition, a color filter having high luminance and a high contrast ratio in a desirable color coordinate may be realized.

The copolymer represented by Chemical Formula 1 may have a maximum absorption wavelength in a wavelength region of about 460 nm to about 560 nm, and may have transmittance of about 80% to about 100% in a wavelength region of about 560 nm to about 660 nm in a spectroscopy analysis. Herein, a solvent may be propylene glycol monomethyl ether acetate (PGMEA) and the like. Within the above range of spectral characteristics, high luminance may be realized.

The copolymer represented by Chemical Formula 1 may have high heat resistance. For example, the copolymer represented by Chemical Formula 1 may have a thermal decomposition temperature of greater than or equal to about 250° C., for example about 250° C. to about 500° C.

The copolymer represented by Chemical Formula 1 may have a weight average molecular weight of about 3,000 g/mol to about 50,000 g/mol, for example about 5,000 g/mol to about 20,000 g/mol. The copolymer represented by Chemical Formula 1 may have an acid value of about 20 mgKOH/g to about 200 mgKOH/g, for example about 50 mgKOH/g to about 150 mgKOH/g. When the weight average molecular weight and the acid value are within the above ranges, dispersion stability and coloring properties can be improved.

The colorant further includes a green pigment in addition to the copolymer represented by Chemical Formula 1. Examples of the green pigment may include without limitation at least one selected from C.I. green pigment 7, C.I. green pigment 36 and/or C.I. green pigment 58.

The colorant may further include a yellow pigment, a red pigment, or a combination thereof, in addition to the green pigment. Examples of the yellow pigment may include without limitation at least one selected from C.I. yellow pigment 138, C.I. yellow pigment 139. C.I. yellow pigment 150 and/or C.I. yellow pigment 185, and examples of the red pigment may include without limitation at least one selected from C.I. red pigment 177 and/or C.I. red pigment 254. In some embodiments, the photosensitive resin composition may include the pigment in an amount of about 0.5, 1, 1.5, 2, 2.5, 3, 3.5, 4, 4.5 or 5 wt %.

The photosensitive resin composition may further include a dispersing agent in order to improve dispersion of the copolymer represented by Chemical Formula 1 and the green pigment in a solvent uniformly.

The dispersing agent may be a non-ionic dispersing agent, an anionic dispersing agent, a cationic dispersing agent, and the like. Examples of the dispersing agent include without limitation polyalkylene glycols and esters thereof, polyoxyalkylenes, polyhydric alcohol ester alkylene oxide addition products, alcohol alkylene oxide addition products, sulfonate esters, sulfonate salts, carboxylate esters, carboxylate salts, alkylamide alkylene oxide addition products, alkyl amines, and the like, and may be used singularly or as a mixture of two or more.

Commercially available examples of the dispersing agent may include without limitation DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001, and the like made by BYK Co., Ltd.; EFKA-47, EFKA-47EA, EFKA-48, EFKA-49, EFKA-100, EFKA-400, EFKA-450, and the like made by EFKA Chemicals Co.; Solsperse 5000, Solsperse 12000, Solsperse 13240, Solsperse 13940, Solsperse 17000, Solsperse 20000, Solsperse 24000GR, Solsperse 27000, Solsperse 28000, and the like made by Zeneka Co.; and/or PB711, PB821, and the like made by Ajinomoto Inc.

The dispersing agent may be included in an amount of about 0.01 to about 15 wt % based on the total weight (100 wt %) of the photosensitive resin composition. When the dispersing agent is included in an amount within the above range, dispersion of the photosensitive resin composition may be improved due to an appropriate viscosity, and thus optical, physicochemical quality of an article may be maintained.

The pigment may be injected into the photosensitive resin composition in a form of dispersion including a mixture of a pigment, a dispersing agent and a solvent. Examples of the solvent for the pigment dispersion may include without limitation ethylene glycol acetate, ethylcellosolve, propylene glycol methyletheracetate, ethyllactate, polyethylene glycol, cyclohexanone, propylene glycol methylether, and the like, and combinations thereof.

The photosensitive resin composition may include the colorant in an amount of about 2 wt % to about 12 wt %, for example about 4 wt % to about 12 wt %, based on the total amount (total weight, 100 wt %) of the photosensitive resin composition. In some embodiments, the photosensitive resin composition may include the colorant in an amount of about 2, 3, 4, 5, 6, 7, 8, 9, 10, 11, or 12 wt %. Further, according to some embodiments of the present invention, the amount of the colorant can be in a range from about any of the foregoing amounts to about any other of the foregoing amounts.

When the colorant is included in an amount within the above range, excellent color characteristics may be provided, and high luminance and high contrast ratio at the same color coordinate may be shown.

(B) Binder Resin

A photosensitive resin composition according to one embodiment includes a binder resin, for example an acrylic-based binder resin.

The acrylic-based resin is a copolymer of a first ethylenic unsaturated monomer and a second ethylenic unsaturated monomer that is copolymerizable with the first ethylenic unsaturated monomer, and is a resin including at least one acrylic-based repeating unit.

The first ethylenic unsaturated monomer is an ethylenic unsaturated monomer including at least one carboxyl group. Examples of the first ethylenic unsaturated monomer include without limitation (meth)acrylic acid, maleic acid, itaconic acid, fumaric acid, and the like, and combinations thereof.

The acrylic-based resin may include the first ethylenic unsaturated monomer in an amount of about 5 to about 50 wt %, for example about 10 to about 40 wt %, based on the total amount (total weight, 100 wt %) of the acrylic-based resin.

Examples of the second ethylenic unsaturated monomer may include without limitation aromatic vinyl compounds such as styrene, α-methylstyrene, vinyltoluene, vinylbenzylmethylether, and the like; unsaturated carboxylic acid ester compounds such as methyl(meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; unsaturated carboxylic acid amino alkyl ester compounds such as 2-aminoethyl(meth)acrylate, 2-dimethylaminoethyl(meth)acrylate, and the like; carboxylic acid vinyl ester compounds such as vinyl acetate, vinyl benzoate, and the like; unsaturated carboxylic acid glycidyl ester compounds such as glycidyl(meth)acrylate and the like; vinyl cyanide compounds such as (meth)acrylonitrile, and the like; unsaturated amide compounds such as (meth)acrylamide, and the like; and the like. They may be used singularly or as a mixture of two or more.

Examples of the acrylic-based resin may include without limitation an acrylic acid/benzylmethacrylate copolymer, a methacrylic acid/benzylmethacrylate copolymer, a methacrylic acid/benzyl methacrylate/styrene copolymer, a methacrylic acid/benzylmethacrylate/2-hydroxyethylmethacrylate copolymer, a methacrylic acid/benzyl methacrylate/styrene/2-hydroxyethylmethacrylate copolymer, and the like. They may be used singularly or as a mixture of two or more.

The acrylic-based binder resin may have a weight average molecular weight of about 3,000 g/mol to 50,000 g/mol, for example about 5,000 g/mol to 40,000 g/mol. When the weight average molecular weight of the acrylic-based binder resin is within the above range, close-contacting (adhesive) properties with a substrate and physicochemical properties may be improved and an appropriate viscosity may be provided.

The photosensitive resin composition may include the binder resin in an amount of about 1 to about 10 wt %, for example about 1 to about 8 wt %, based on the total amount (total weight, 100 wt %) of the photosensitive resin composition. In some embodiments, the photosensitive resin composition may include the binder resin in an amount of about 1, 2, 3, 4, 5, 6, 7, 8, 9, or 10 wt %. Further, according to some embodiments of the present invention, the amount of the binder resin can be in a range from about any of the foregoing amounts to about any other of the foregoing amounts.

When the binder resin is included in an amount within the above range, developability may be improved and excellent surface smoothness may be improved due to improved cross-linking during the manufacture of a color filter.

(C) Photopolymerizable Monomer

The photopolymerizable monomer may be mono-functional and/or multi-functional ester of (meth)acrylic acid including at least one ethylenic unsaturated double bond.

The photopolymerizable monomer has the ethylenic unsaturated double bond and thus, may cause sufficient polymerization during exposure in a pattern-forming process and form a pattern that can have excellent heat resistance, light resistance, and chemical resistance.

Examples of the photopolymerizable monomer may include without limitation ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether (meth)acrylate, trimethylol propane tri(meth)acrylate, tris(meth)acryloyloxyethyl phosphate, novolacepoxy (meth)acrylate, and the like, and combinations thereof.

Commercially available examples of the reactive unsaturated compound are as follows. Examples of a mono-functional (meth)acrylic acid ester may include without limitation Aronix M-101®, M-111®, and/or M-114® (Toagosei Chemistry Industry Co., Ltd.); KAYARAD TC-110S®, and/or TC-120S® (Nippon Kayaku Co., Ltd.); V-158® and/or V-2311® (Osaka Organic Chemical Ind., Ltd.), and the like. Examples of a difunctional (meth)acrylic acid ester may include without limitation Aronix M-210®, M-240®, and/or M-6200® (Toagosei Chemistry Industry Co., Ltd.), KAYARAD HDDA®, HX-220®, and/or R-604® (Nippon Kayaku Co., Ltd.), V-260®, V-312®, and/or V-335 HP® (Osaka Organic Chemical Ind., Ltd.), and the like. Examples of a tri-functional (meth)acrylic acid ester may include without limitation Aronix M-309®, M-400®, M-405®, M-450®, M-7100®, M-8030®, and/or M-8060® (Toagosei Chemistry Industry Co., Ltd.), KAYARAD TMPTA®, DPCA-20®, DPCA-30®, DPCA-60®, and/or DPCA-120® (Nippon Kayaku Co., Ltd.), V-295®, V-300®, V-360®, V-GPT®, V-3PA®, and/or V-400® (Osaka Yuki Kayaku Kogyo Co. Ltd.), and the like. These may be used singularly or as a mixture of two or more.

The photopolymerizable monomer may be treated with acid anhydride to improve developability.

The photosensitive resin composition may include the photopolymerizable monomer in an amount of about 2 wt % to about 20 wt %, for example about 3 wt % to about 15 wt %, based on the total amount (total weight, 100 wt %) of the photosensitive resin composition. In some embodiments, the photosensitive resin composition may include the photopolymerizable monomer in an amount of about 2, 3, 4, 5, 6, 7, 8, 9, 10, 11, 12, 13, 14, 15, 16, 17, 18, 19, or 20 wt %. Further, according to some embodiments of the present invention, the amount of the photopolymerizable monomer can be in a range from about any of the foregoing amounts to about any other of the foregoing amounts.

When the photopolymerizable monomer is included in an amount within the above range, pattern characteristics and developability may be improved during manufacture of a color filter.

(D) Photopolymerization Initiator

Examples of the photopolymerization initiator may include without limitation acetophenone-based compounds, benzophenone-based compounds, thioxanthone-based compounds, benzoin-based compounds, triazine-based compounds, oxime-based compounds, and the like, and combinations thereof.

Examples of the acetophenone-based compound may include without limitation 2,2'-diethoxy acetophenone, 2,2'-dibutoxy acetophenone, 2-hydroxy-2-methylpropiophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like, and combinations thereof.

Examples of the benzophenone-based compound may include without limitation benzophenone, benzoyl benzoate, benzoyl benzoate methyl, 4-phenyl benzophenone, hydroxy benzophenone, acrylated benzophenone, 4,4'-bis(dimethylamino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like, and combinations thereof.

Examples of the thioxanthone-based compound may include without limitation thioxanthone, 2-methylthioxanthone, isopropyl thioxanthone, 2,4-diethyl thioxanthone, 2,4-diisopropyl thioxanthone, 2-chlorothioxanthone, and the like, and combinations thereof.

Examples of the benzoin-based compound may include without limitation benzoin, benzoin methyl ether, benzoin ethyl ether, benzoin isopropyl ether, benzoin isobutyl ether, benzyldimethylketal, and the like, and combinations thereof.

Examples of the triazine-based compound may include without limitation 2,4,6-trichloro-s-triazine, 2-phenyl 4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl 4,6-bis(trichloro methyl)-s-triazine, bis(trichloromethyl)-6-styryl-s-triazine, 2-(naphthol-yl)-4,6-bis(trichloromethyl)-s-triazine, 2-(4-methoxynaphthol-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like, and combinations thereof.

Examples of the oxime-based compound may be include without limitation O-acyloxime-based compounds, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one and the like, and combinations thereof. Examples of the O-acyloxime-based compounds may include without limitation 1,2-octandione, 2-dimethylamino-2-(4-methylbenzyl)-1-(4-morpholin-4-yl-phenyl)-butan-1-one, 1-(4-phenylsulfanyl phenyl)butane-1,2-dione2-oxime-O-benzoate, 1-(4-phenylsulfanyl phenyl)-octane-1,2-dione2-oxime-O-benzoate, 1-(4-phenylsulfanyl phenyl)-octan-1-oneoxime-O-acetate, 1-(4-phenylsulfanyl phenyl)-butan-1-oneoxime-O-acetate and the like, and combinations thereof.

The photopolymerization initiator may further include a carbazole-based compound, a diketone-based compound, a sulfonium borate-based compound, a diazo-based compound, an imidazole-based compound, a biimidazole-based compound, and the like, and combinations thereof, instead of or in addition to the above compounds.

The photosensitive resin composition may include the photopolymerization initiator in an amount of about 0.1 wt % to about 4 wt %, for example about 0.2 wt % to about 3 wt %, based on the total amount (total weight, 100 wt %) of the photosensitive resin composition. In some embodiments, the photosensitive resin composition may include the photopolymerization initiator in an amount of about 0.1, 0.2, 0.3, 0.4, 0.5, 0.6, 0.7, 0.8, 0.9, 1, 2, 3, or 4 wt %. Further, according to some embodiments of the present invention, the amount of the photopolymerization initiator can be in a range from about any of the foregoing amounts to about any other of the foregoing amounts.

When the photopolymerization initiator is included in an amount within the above range, the composition may be sufficiently photopolymerized when exposed to light during the pattern-forming process for preparing a color filter, which can result in excellent sensitivity and can improve transmittance.

(E) Solvent

The solvent is a material having compatibility with the colorant, the binder resin, the photopolymerizable monomer and the photopolymerization initiator, but not reacting therewith.

The solvent is not specifically limited. Examples of the solvent include without limitation alcohols such as methanol, ethanol, and the like; ethers such as dichloroethyl ether, n-butyl ether, diisoamyl ether, methylphenyl ether, tetrahydrofuran, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid alkyl esters such as methyl lactate, ethyl lactate, and the like; hydroxyacetic acid alkyl esters such as methyl hydroxyacetate, ethyl hydroxyacetate, butyl hydroxyacetate, and the like; acetic acid alkoxyalkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; ketonic acid ester compounds such as ethyl pyruvate, and the like, and combinations thereof. Furthermore, the solvent may include N-methylformamide, N,N-dimethylformamide, N-methylformanilide, N-methylacetamide, N,N-dimethylacetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, and the like. These may be used singularly or as a mixture of two or more.

The solvent, considering miscibility, reactivity, and the like, may include glycol ethers such as ethylene glycol monoethyl ether, and the like; ethylene glycol alkylether acetates such as ethyl cellosolve acetate, and the like; esters such as 2-hydroxyethyl propionate, and the like; diethylene glycols such as diethylene glycol monomethyl ether, and the like; propylene glycol alkylether acetates such as propylene glycol monomethylether acetate, propylene glycol propylether acetate, and the like, and combinations thereof.

The photosensitive resin composition may include the solvent in a balance amount, for example, in an amount ranging from about 20 to about 90 wt %, based on the total amount (total weight, 100 wt %) of the photosensitive resin composition. In some embodiments, the photosensitive resin composition may include the solvent in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the solvent can be in a range from about any of the foregoing amounts to about any other of the foregoing amounts.

When the solvent is included in an amount within the above range, the photosensitive resin composition may have an appropriate viscosity and thus physical and optical properties of articles may be improved.

(F) Other Additive(s)

The photosensitive resin composition may further include one or more other additives. Examples of the additives may include without limitation malonic acid; 3-amino-1,2-propanediol; silane-based coupling agents including a vinyl group or a (meth)acryloxy group; leveling agents; fluorine-based surfactants; and/or radical polymerization initiators, in order to prevent stains and/or spots during the coating, to adjust leveling, and/or to prevent pattern residue due to non-development.

The amount of the additive may be controlled depending on desired properties.

The coupling agent may be a silane-based coupling agent. Examples of the silane-based coupling agent may include without limitation trimethoxysilyl benzoic acid, γ-methacryl oxypropyl trimethoxysilane, vinyl triacetoxysilane, vinyl trimethoxysilane, γ-iso cyanate propyl triethoxysilane, γ-glycidoxy propyl trimethoxysilane, β-(3,4-epoxycyclohexyl)ethyltrimethoxysilane, and the like. These may be used singularly or in a mixture of two or more.

The silane-based coupling agent may be included in an amount of about 0.01 parts by weight to about 1 part by weight based on the total amount (total weight, 100 wt %) of the photosensitive resin composition The photosensitive resin composition may further include a fluorine-based surfactant as needed. Examples of the fluorine-based surfactant may include F-482, F-484, F-478, F-554, and the like made by DIC Co., Ltd., but are not limited thereto. These may be used singularly or in a mixture of two or more.

The fluorine-based surfactant may be included in an amount of about 0.01 wt % to about 1 wt %, for example about 0.01 wt % to about 0.8 wt %, based on the total amount (total weight, 100 wt %) of the photosensitive resin composition. When the fluorine-based surfactant is included in an amount within the above range, the composition may have fewer impurities generated after the development.

The photosensitive resin composition according to one embodiment may be an alkali development type capable of being cured by radiating light and being developed with an alkali aqueous solution. When the photosensitive resin composition is laminated on (applied to) a substrate and radiated by (exposed to) an actinic ray to form a pattern for a color filter, the photosensitive resin composition is reacted by the actinic ray and thus sharply deteriorates solubility a reaction region compared with a non-reaction region. Accordingly, the non-reaction region may be selectively dissolved. The solution removing a non-exposure region is a developing solution, and this developing solution can be classified into two types, an organic solvent type and an alkali development type. The organic solvent type developing solution can cause atmosphere contamination and can harm a human body, and thus the alkali development type solution may be used. The photosensitive resin composition according to one embodiment uses an alkali development type solution and thus may be useful in terms of exposure to the environment and the human body.

According to another embodiment of the present invention, a color filter manufactured using the photosensitive resin composition is provided.

This color filter may be manufactured in a general method. For example, the color filter may be manufactured by applying the composition to a substrate, for example using a method of spin-coating, roller-coating, slit-coating, and the like the photosensitive resin composition on glass to have a thickness ranging from about 3.0 to about 4.0 μm. After the coating, ultraviolet (UV) radiation is directed to the coated composition layer to form a pattern required for a color filter, the radiated coated composition layer is treated with an alkali developing solution, and an unradiated (non-exposed) region thereof may be dissolved, forming a pattern for an image color filter. This process is repeated depending on the necessary number of R, G, and B colors, fabricating a color filter having a desired pattern. In addition, the image pattern acquired by the development can be cured through heat treatment, actinic ray radiation, or the like, to improve crack resistance, solvent resistance, and the like.

A color filter using the photosensitive resin composition can have high luminance and a high contrast ratio.

The color filter using the photosensitive resin composition may have color reproducibility of greater than or equal to about 35%, for example greater than or equal to about 68%, as another example greater than or equal to about 72%, and as another example greater than or equal to about 80%, and as another example greater than or equal to about 85% relative to NTSC (ClExy 1931 color coordinate).

Hereinafter, the present invention is illustrated in more detail with reference to examples. These examples, however, are not in any sense to be interpreted as limiting the scope of the invention.
(Preparation of Copolymer)

PREPARATION EXAMPLE 1

Preparation of Monomer

A monomer (Chemical Formula 12) is synthesized as shown in the following Reaction Scheme 1.

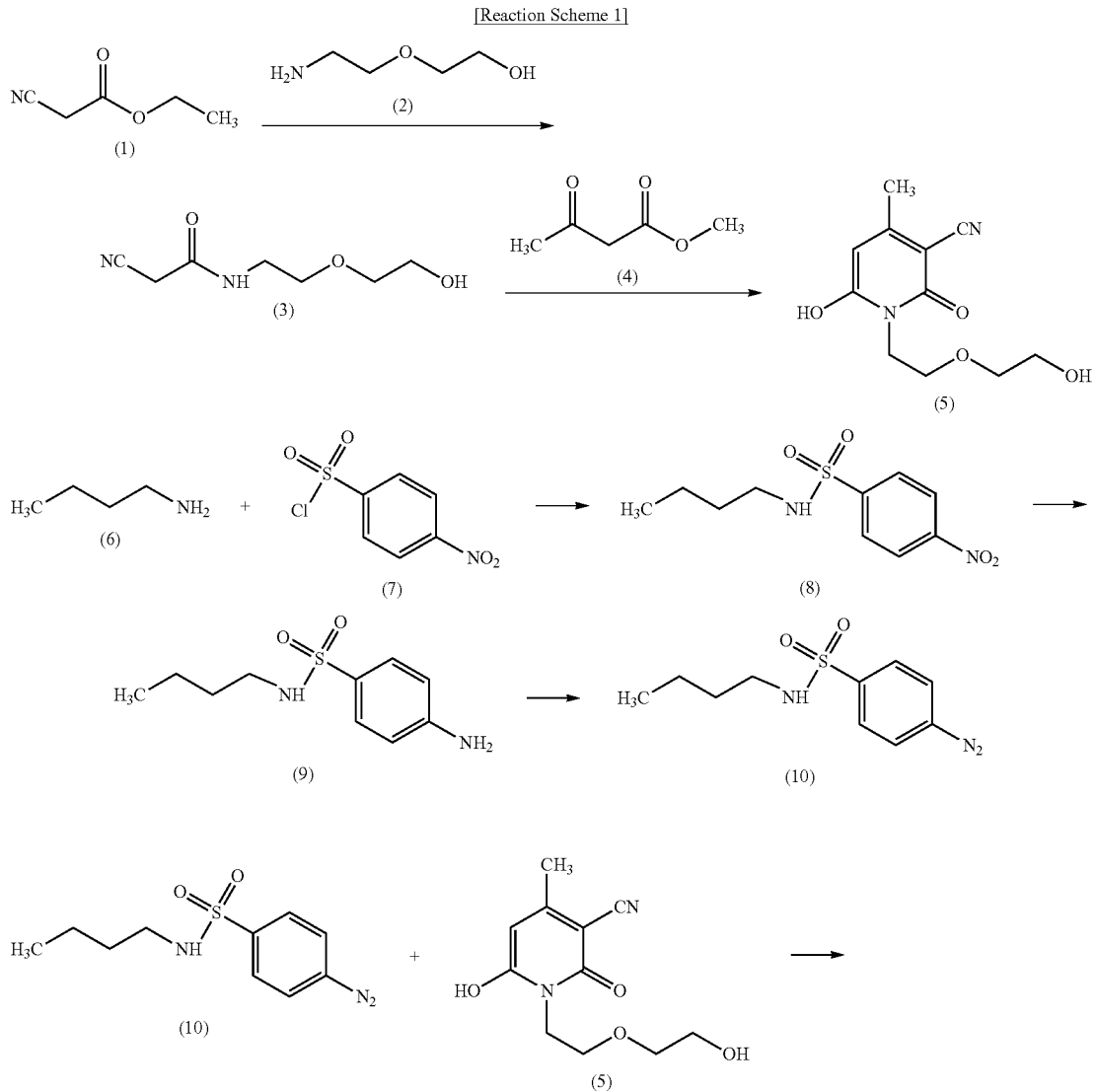

[Reaction Scheme 1]

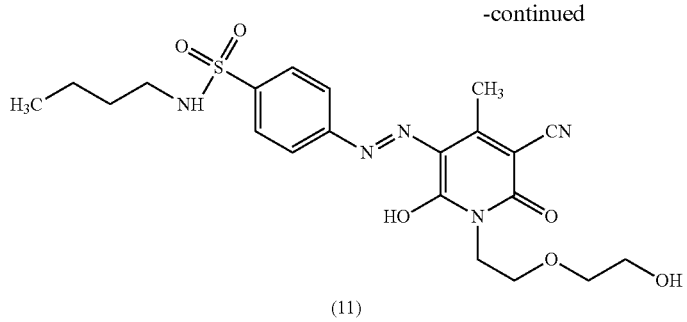

(11)

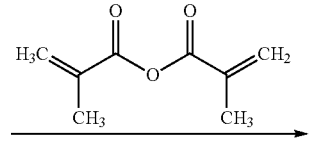

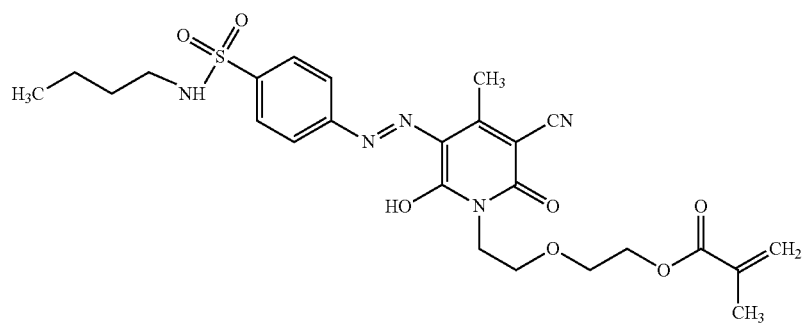

(12)

56.56 g (0.5 mol) of a compound (1) and 52.57 g (0.5 mol) of a compound (2) are mixed and reacted at 70° C. for 3 hours to obtain a compound (3). The compound (3) is cooled to room temperature, and 150 ml of ethanol and 69.67 g (0.6 mol) of a compound (4) are added and heated at 45° C. Then, 220 ml (3 M) of a potassium hydroxide ethanol solution is dripped and the resultant mixture is reacted at 80° C. for 7 hours. A solvent is removed from the obtained reactants, 55 g of sodium chloride (NaCl) is added, and filtered and precipitates are removed. The reactants are dried using magnesium sulfate ($MgSO_4$), and the solvent is removed to obtain 114.80 g of a compound (5), and a yield is 96.4%.

26.33 g (0.36 mol) of a compound (6), 66.49 g (0.3 mol) of a compound (7) and 150 ml of orthodichlorobenzene are mixed and heated at 60° C. 15 ml of 10 M sodium carbonate aqueous solution is dripped to the resultant reaction solution and the mixture is stirred for 30 minutes. After stirring the mixture for 2 hours, the mixture is cooled to room temperature, and filtered and is rinsed with water to obtain 73.2 g of a compound (8) with a yield of 94.5%.

30.2 g of reduced iron, 22.0 g of acetic acid, and 63.0 g of water are mixed and stirred at 80° C., and then 25.83 g of the compound (8) is gradually added to the resultant mixture and 100.0 ml of ethanol is dripped thereto. Subsequently, the resultant mixture is stirred at 80° C. for 1 hour. The mixture is cooled to room temperature, 26.0 g of sodium carbonate is added thereto, 200 ml of methanol is added, and the mixture is stirred for 30 minutes. The obtained mixture is filtered using a Celite filter and rinsed with acetone to remove a solvent in a liquid phase. The obtained reaction solution is dissolved in 500 ml of acetone, and insoluble materials are removed. The obtained reaction solution is dried using sodium sulfate and then concentrated to obtain 18.2 g of a compound (9) with a yield of 79%.

11.42 g of the compound (9), 48 ml of 36% hydrochloric acid and 210 ml of distilled water are mixed, and the obtained mixture is cooled to 0° C. While maintaining the internal temperature at 5° C. or less, sodium nitrite aqueous solution (3.35 g of $NaNO_2$ and 40 g of water) is dripped to the mixture. After dripping addition, the mixed solution is stirred for 3 hours to obtain a compound (10) while maintaining the temperature at 5 to 10° C.

14.3 g of the compound (5) and 90 g of water are mixed, and a solution including 2 N sodium hydroxide aqueous solution is added to prepare a separate solution in order to adjust pH to be 8, and the compound (10) is slowly dripped thereto under 0° C. 10% sodium carbonate aqueous solution is dripped to the reaction solution in order to adjust pH to be 6 to 7. The resultant mixture is filtered, 500 ml of acetone is dissolved, activated carbon and sodium sulfate are added, and then the resultant is filtered using a Celite filter. Subsequently, a solvent is removed from the solution, and the obtained solid is vacuum-dried to obtain 14.10 g of a compound (11) with a yield of 58.8%.

6.07 g of triethylamine, 2.93 g of N,N-dimethylaminopyridine, and 6.17 g of methacrylic anhydride dissolved in 100 ml and of acetonitrile and 9.59 g of the compound (11) is reacted at room temperature for 6 hours, an excessive amount of distilled water is poured to form precipitates, the resultant is filtered, is rinsed with distilled water and dried to obtain 9.88 g of a compound (12) with a yield of 90.2%.

PREPARATION EXAMPLE 2

Preparation of Copolymer 1000 g of Cyclohexanone (Shiny Chemical Industrial Co., Ltd.) is heated up to 80° C. in a 10 L polymerization reactor equipped with a reflux cooler and an agitator, and a solution obtained by dissolving 300 g of the compound (12), 300 g of benzyl methacrylate (Hitach Ltd.), 106 g of methacrylic acid (Daejung Chemicals & Metals Co., Ltd.), and 92 g of 2,2'-azobisisobutyronitrile (Wako Chemicals, Inc.) in 5000 g of cyclohexanone (Shiny Chemical Industrial Co., Ltd.) is slowly added to the heated polymerization reactor for 3 hours. When the addition is complete, the mixture is stirred for 14 hours, obtaining a polymer including a repeating unit represented by Chemical Formula 1-1. The polymer has a weight average molecular weight of 9,800 g/mol when measured by using gel permeation chromatography (GPC) made by Waters Co. and an acid value of 100 mgKOH/g.

[Chemical Formula 1-1]

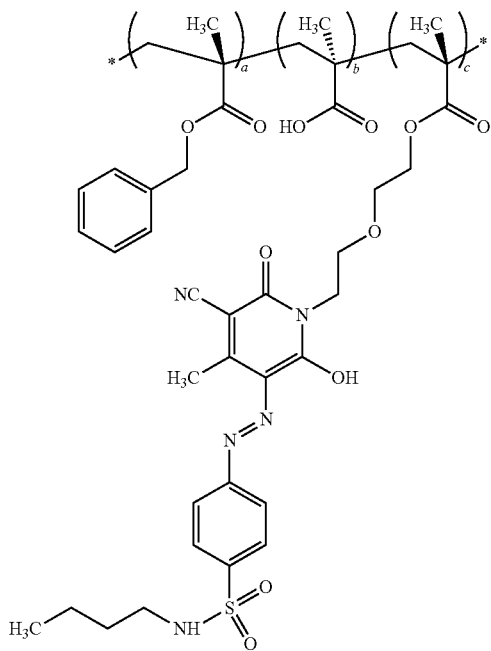

In Chemical Formula 1-1, a=19, b=19 and c=9

(Preparation of Photosensitive Resin Composition)

EXAMPLES 1 TO 3 AND COMPARATIVE EXAMPLES 1 TO 5

A photopolymerization initiator is dissolved in a solvent in a composition provided in the following Table 1, and the solution is stirred at room temperature for 1 hour. Next, a binder resin and a photopolymerizable monomer are added thereto with a composition of Table 1, and the resulting mixture is stirred at room temperature for 1 hour. A fluorine-based surfactant is added thereto with a composition of Table 1, and the resulting mixture is stirred at room temperature for 1 hour. After a colorant is added thereto with a composition of Table 1 and the resulting mixture is stirred at room temperature for 2 hours, the solution is three times filtered to remove impurities, preparing photosensitive resin compositions of Examples 1 to 3 and Comparative Examples 1 to 5. The components used for the photosensitive resin composition are as follows.

(A) COLORANT (A-1) COPOLYMER OF PREPARATION EXAMPLE 2

(A-2) C.I. yellow pigment 150

(A-3) C.I. green pigment 58

(A-4) C.I. green pigment 36

(A-5) C.I. green pigment 7

(B) Binder Resin

Polybenzylmethacrylate resin (NPR1520, Miwon Commercial Co., Ltd)

(C) Photopolymerizable Monomer

Dipentaerythritolhexaacrylate (DPHA, Nippon Kayaku Co. Ltd.)

(D) Photopolymerization Initiator

Oxime-based compound (CGI-124, BASF)

(E) Solvent

Propylene glycolmethylethylacetate (Sigma-aldrich)

(F) Fluorine-Based Surfactant

F-554 (DIC Co., Ltd.)

TABLE 1

(unit: wt %)

| | | Examples | | | Comparative Examples | | | | |
|---|---|---|---|---|---|---|---|---|---|
| | | 1 | 2 | 3 | 1 | 2 | 3 | 4 | 5 |
| Colorant | A-1 | 4.8 | 5.5 | 7.2 | — | — | — | 2.0 | 15.0 |
| | A-2 | — | — | — | 6.2 | 6.6 | 7.5 | — | — |
| | A-3 | 4.5 | — | — | 4.0 | — | — | 4.5 | 4.5 |
| | A-4 | — | 4.0 | — | — | 3.8 | — | — | — |
| | A-5 | — | — | 3.0 | — | — | 2.7 | — | — |
| Binder resin | | 4.0 | 4.3 | 4.5 | 3.8 | 4.1 | 4.0 | 4.0 | 4.0 |
| Photopolymerizable monomer | | 10.0 | 10.2 | 10.8 | 9.5 | 9.8 | 10.1 | 10.0 | 10.0 |
| Photopolymerization initiator | | 1.0 | 1.1 | 0.9 | 0.9 | 0.9 | 1.1 | 1.0 | 1.0 |
| Solvent | | 75.6 | 74.8 | 73.5 | 75.5 | 74.7 | 74.5 | 78.4 | 65.4 |
| Fluorine-based surfactant | | 0.1 | 0.1 | 0.1 | 0.1 | 0.1 | 0.1 | 0.1 | 0.1 |

Evaluation: Color Characteristics

The photosensitive resin compositions according to Examples 1 to 3 and Comparative Examples 1 to 5 are respectively coated on a substrate to form a coating that is 3.0 μm to 4.0 μm thick, and dried on a hot plate at 90° C. for 1 minute, obtaining each film. The films are radiated with 100 mJ/cm² of exposure dose (365 nm reference) and the radiated films are baked in an oven of 230° C. for 30 minutes. Thereafter, luminance, contrast ratio, heat resistance, chemical resistance and color reproducibility of the films are measured using a MCPD3000 spectrophotometer of OTSUKA ELECTRONIC Co., Ltd. and the results are shown in the following Table 2.

TABLE 2

| | Examples | | | Comparative Examples | | | | |
|---|---|---|---|---|---|---|---|---|
| | 1 | 2 | 3 | 1 | 2 | 3 | 4 | 5 |
| Gx | 0.250 | 0.251 | 0.249 | 0.250 | 0.248 | 0.248 | 0.250 | 0.250 |
| Gy | 0.627 | 0.627 | 0.627 | 0.627 | 0.627 | 0.627 | 0.627 | 0.627 |
| luminance | 49.5 | 46.2 | 21.5 | 48.0 | 44.5 | 20.8 | 48 | 47.3 |
| contrast ratio | 9700 | 9200 | 8400 | 9400 | 9000 | 8100 | 9500 | 9600 |
| heat resistance (ΔEab*) | 1.5 | 1.5 | 1.5 | 1.5 | 1.5 | 1.5 | 1.5 | 1.5 |
| Chemical resistance (ΔEab*) | 2.0 | 2.0 | 2.0 | 2.0 | 2.0 | 2.0 | 2.0 | 2.0 |
| Color reproducibility (%) | 86 | 86 | 86 | 86 | 86 | 86 | 86 | 86 |

From Table 2, the photosensitive resin composition including the copolymer of Preparation Example 2 shows higher luminance and contrast ratio due to a decreased amount of a yellow pigment compared with those of Comparative Examples 1 to 3 without the copolymer. The photosensitive resin composition including 100 to 300 parts by weight of the copolymer of Preparation Example 2 based on 100 parts by weight of the green pigment shows improved luminance and contrast ratio compared with those of Comparative Examples 4 and 5 which include the copolymer of Preparation Example 2 in an amount outside of the above range of 100 to 300 parts by weight of the copolymer of Preparation Example 2 based on 100 parts by weight of the green pigment.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A photosensitive resin composition comprising:
   (A) a colorant consisting essentially of a copolymer represented by Chemical Formula 1 and a green pigment;
   (B) a binder resin;
   (C) a photopolymerizable monomer;
   (D) a photopolymerization initiator; and
   (E) a solvent,
   wherein the copolymer represented by Chemical Formula 1 is included in an amount of about 100 parts by weight to about 300 parts by weight based on about 100 parts by weight of the green pigment:

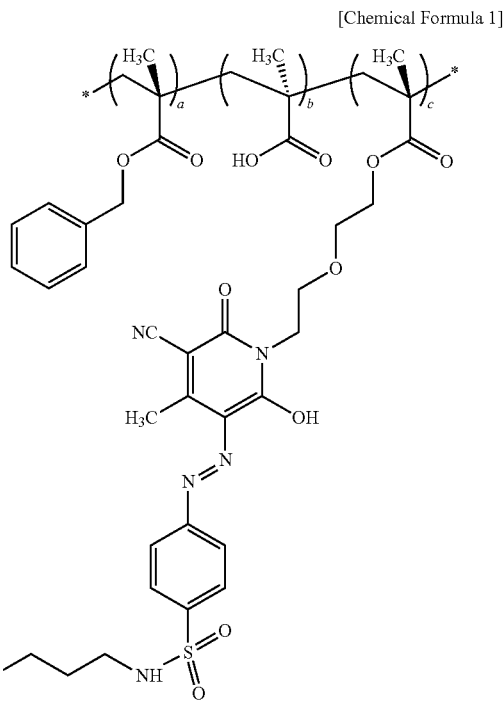

[Chemical Formula 1]

wherein in Chemical Formula 1,
a is an integer ranging from 1 to 100, b is an integer ranging from 1 to 100, and c is an integer ranging from 1 to 50.

2. The photosensitive resin composition of claim 1, wherein the copolymer represented by Chemical Formula 1 is included in an amount of about 100 parts by weight to about 250 parts by weight based on about 100 parts by weight of the green pigment.

3. The photosensitive resin composition of claim 1, wherein the copolymer represented by Chemical Formula 1 is a yellow dye.

4. The photosensitive resin composition of claim 1, wherein the copolymer represented by Chemical Formula 1 has a maximum absorption wavelength in a wavelength region of about 460 nm to about 560 nm, and transmittance of about 80% to about 100% in a wavelength region of about 560 nm to about 660 nm.

5. The photosensitive resin composition of claim 1, wherein the copolymer represented by Chemical Formula 1 has a thermal decomposition temperature of about 250 °C. to about 500 °C.

6. The photosensitive resin composition of claim 1, wherein the copolymer represented by Chemical Formula 1 has a weight average molecular weight of about 3,000 g/mol to about 50,000 g/mol.

7. The photosensitive resin composition of claim 1, wherein the copolymer represented by Chemical Formula 1 has an acid value of about 20 mgKOH/g to about 200 mgKOH/g.

8. The photosensitive resin composition of claim 1, wherein the green pigment comprises C.I. green pigment 7, C.I. green pigment 36 and/or C.I. green pigment 58.

9. The photosensitive resin composition of claim 1, wherein the photosensitive resin composition comprises:
   about 2 wt % to about 12 wt % of the colorant (A);
   about 1 wt % to about 10 wt % of the binder resin (B);
   about 2 wt % to about 20 wt % of the photopolymerizable monomer (C);
   about 0.1 wt % to about 4 wt % of the photopolymerization initiator (D);
   and a balance amount of the solvent (E).

10. The photosensitive resin composition of claim 1, wherein the photosensitive resin composition further comprises malonic acid; 3-amino-1,2-propanediol; a coupling agent having a vinyl group or a (meth)acryloxy group; a leveling agent; a fluorine-based surfactant; and/or a radical polymerization initiator.

11. A color filter manufactured using the photosensitive resin composition of claim 1.

12. The photosensitive resin composition of claim 1, wherein the colorant (A) consists of a copolymer represented by Chemical Formula 1 and a green pigment.

* * * * *